Feb. 3, 1953 — A. J. CHAPIN — 2,627,424
LANDING GEAR FOR TRAILER VEHICLES
Filed Dec. 9, 1950
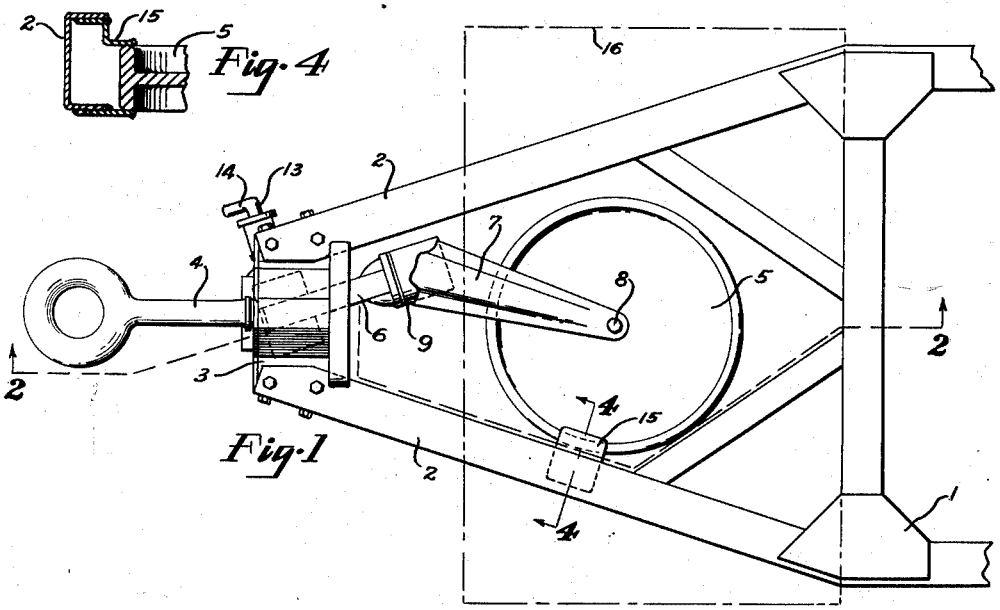
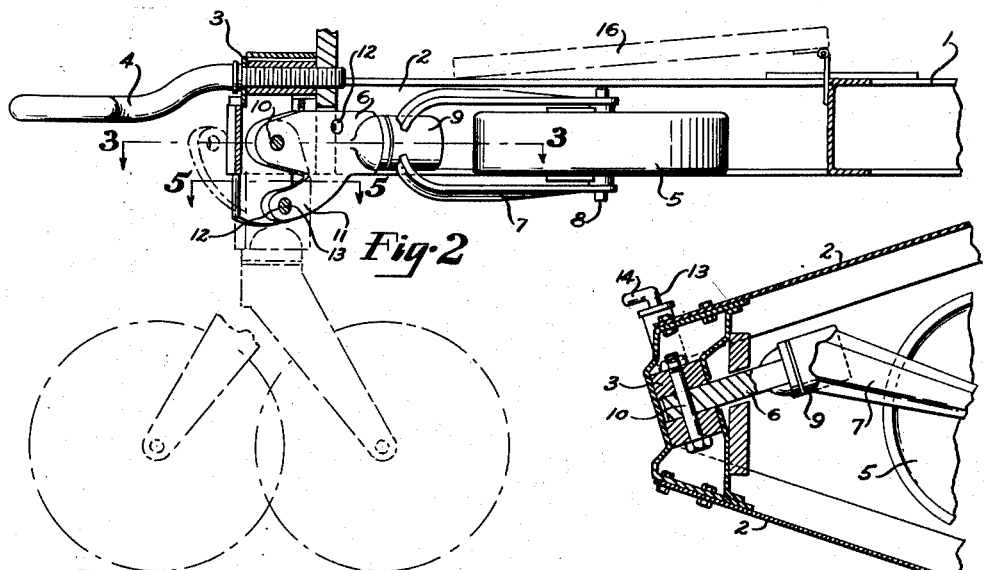
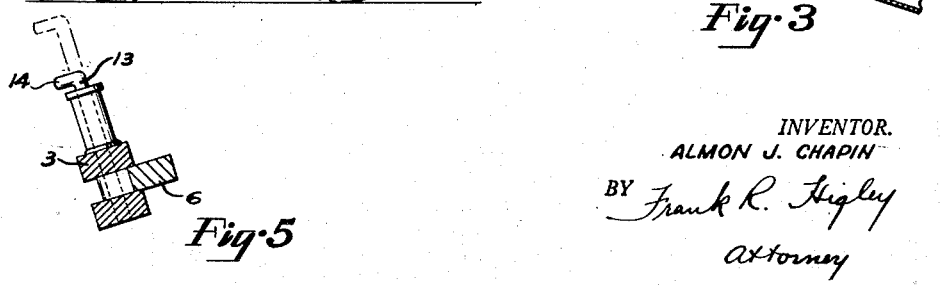
INVENTOR.
ALMON J. CHAPIN
BY Frank R. Higley
Attorney Patented Feb. 3, 1953

2,627,424

UNITED STATES PATENT OFFICE 2,627,424

LANDING GEAR FOR TRAILER VEHICLES

Almon J. Chapin, Oberlin, Ohio, assignor to The C. A. Olsen Manufacturing Company, Elyria, Ohio, a corporation of Ohio Application December 9, 1950, Serial No. 199,957

6 Claims. (Cl. 280—33.4)

This invention relates to landing gear for trailer vehicles.

The type of vehicle contemplated is one having a single, wheeled axle through which most of the load is supported, while traveling the vehicle being drawn by forwardly extending drawbar means hitched to a tractor vehicle, the hitch serving also to secure the trailer against tilting about its axle.

The landing gear contemplated is of castor wheel type providing an upright swivel axis at the front end of the drawbar means for support of the trailer against forward tilting on its axle when unhitched from its tractor, while permitting some maneuverability of the trailer in such condition. Also, the landing gear is retractable from its working position just described, rearwardly and upwardly to an idle position.

More particularly, this invention contemplates, as an object thereof, a horizontal disposition of the castor wheel when in idle position.

The castor arrangement contemplated is one wherein the wheel axle has very substantial offset from its swivel axis, so that the means for interconnection between the axle and the axis must be angular or curved.

The invention provides, as a further object, a substantial balance of the weight of the landing gear parts, lateral of the vehicle, in rest position, together with substantially central location of the wheel itself in such position.

Moreover, a further object of the invention is to provide extreme compactness and simplicity of both landing gear and drawbar wherein free clearance is had both above and below the drawbar when the landing gear is retracted to idle position.

The invention is particularly applicable to ordnance trailers of the type having a body including a gate at its forward end hinged to open down over the drawbar, and such gate arrangement is permitted, as a further object of this invention.

Still another object is to provide novel means for securing the landing gear with the drawbar means in idle position.

Further objects and advantages will be apparent from the following description taken in connection with the accompanying drawings, wherein:

Fig. 1 is a plan view of pertinent portions of an ordnance trailer vehicle embodying the invention, the landing gear being shown as retracted to idle position, and broken lines indicating the periphery of a forward body gate in lowered position.

Fig. 2 is a view generally in side elevation of the same, but particularly as taken along the line 2—2 of Fig. 1, parts being broken away to show details of construction, the landing gear being shown by solid lines as in retracted position, and broken lines indicating working positions of the landing gear and open position of the door.

Fig. 3 is a view corresponding to Fig. 1 but with parts broken away as in the plane of line 3—3, Fig. 2, to show details of construction.

Fig. 4 is a detail in vertical section as in the plane of line 4—4 of Fig. 1.

Fig. 5 is a detail as in the plane of line 5—5, Fig. 2.

With reference now to the drawings, 1 indicates generally the frame of the vehicle, which includes a pair of drawbar members 2, forwardly extending in convergent relation, to a drawbar head generally indicated at 3.

A lunette 4, having an eye to receive the pintle of a tractor, is mounted on the head 3 for draft of the trailer, the frame 1 of which will be understood as supported by main wheels having an axle located rearwardly of the parts appearing in the drawing, to support the load on the frame 1 in practically its entirety but with slight forward preponderance of balance—all in usual and well-known manner.

Retractable landing gear is associated with the head 3, and includes the wheel 5 adjustable between the idle position shown in full lines, Figs. 1, 2, and 3, and working positions indicated in broken lines Fig. 2.

The landing gear as here shown includes principally a head 6, a fork 7 carrying the wheel axle 8, and a swivel 9 having an axis from which the axle 8 is substantially offset so that the landing gear effective between the head 6 and wheel 5 includes a substantial angle or bend.

The head 3 of the drawbar and the head 6 of the landing gear have interconnection by hinge means providing their relative motion about a hinge pin bolt 10. The bolt 10 is horizontally disposed, but at a substantial angle from the fore and aft center line of the vehicle as shown in Fig. 3.

This angle is such as to compensate for the angle between the forks 7 and the head 6 of the landing gear with the following resultant relationships:

When the landing gear is adjusted to working position as indicated in broken lines Fig. 2, the axis of the swivel 9 will be vertical and the axle of the wheel 5 horizontal so that the wheel may operate with castor effect as indicated by the two sets of broken lines Fig. 2, both about its own axle 8 and about the swivel axis.

Moreover, when the landing gear is in retracted position as shown in Figs. 1, 2 and 3, the swivel axis will be horizontally disposed, and the wheel 5 may be disposed horizontally intermediate the drawbar members 2 substantially rearwardly of the drawbar head 3.

More particularly, in such idle position of the landing gear, the parts are so proportioned and arranged that the wheel has slight lateral offset in one direction and the swivel 9 such lateral offset in the opposite direction, that the weight of the landing gear parts has equal distribution with respect to the longitudinal center of the vehicle.

For selective securement of the head 6 of the landing gear in its idle and/or running positions, it is provided with an arm 11 having a pair of openings 12 to optionally receive a plunger 13 having a handle 14, the plunger being mounted in the drawbar head 3 in parallel relation with the hinge pin bolt 10 and withdrawable by its handle 14 from the head 6. Preferably, and as is known in the art, the plunger may be provided with a spring so that it will automatically enter either of the openings 12 in the head 6 upon registry therewith, to secure the head as it attains either of its two positions.

For securement of the wheel 5 and fork 7 against motion about the swivel axis when in idle position, clip means 15 is provided on one of the drawbar members 2, and preferably the near one as indicated in Fig. 1, into the mouth of which a rim portion of the wheel 5 may be entered as the landing gear approaches retraction to idle position.

The same clip means 15 serves in dropping the landing gear to working arrangement. This operation is accomplished by simply pulling the handle 14 of the plunger 13, whereupon release of the head 6 from the plunger will cause the wheel 5 to commence its dropping movement with a swing about the clip means 15 by which swing the wheel will naturally reach bottom in the right-hand broken line position indicated Fig. 2, and with some wedge effect against the ground as the plunger snaps into securement of the head 6 in its working position.

It will be apparent that by the arrangement described, the castor wheel of the landing gear, when in working position may have very substantial offset from its swivel axis, for easy maneuverability, yet when retracted to idle position a very compact arrangement is made between the drawbar and landing gear parts.

Particularly, substantially no clearance either above or below the drawbar itself is impaired by the landing gear when retracted. Thus, such body as is mounted on the frame 1 of the vehicle may include a forward gate hinged to open downwardly over the drawbar and landing gear as indicated in broken lines at 16, Figs. 1 and 2.

I claim:

1. In a trailer vehicle of the class described having a drawbar head and frame means including a pair of laterally spaced drawbar members extending rearwardly from said head, and castor wheel landing gear including a head, a wheel, an axle therefor, and a support for said axle, swivel-mounted in said head and formed to dispose said axle substantially offset from the swivel axis: hinge means mounting said landing gear head on said drawbar head to swing thereon about a horizontal axis angularly disposed between lines running longitudinally and transversely of said vehicle, to provide retractile adjustment of said landing gear between a working arrangement wherein said swivel axis is upright and said axle is horizontal, and an idle arrangement wherein said swivel axis is horizontal, said axle is upright, and said wheel is disposed intermediate said drawbar members.

2. In a trailer vehicle of the class described having a drawbar head and frame means including a pair of drawbar members extending divergently rearwardly from said head, and castor wheel landing gear including a head, a wheel, an axle therefor, and a support for said axle, swivel-mounted in said head and formed to dispose said axle substantially offset from the swivel axis: hinge means mounting said landing gear head on said drawbar head to swing thereon about a horizontal axis angularly disposed between lines running longitudinally and transversely of said vehicle, to provide retractile adjustment of said landing gear between a working arrangement wherein said swivel axis is upright and said axle is horizontal, and an idle arrangement wherein said swivel axis is horizontal, said axle is upright, and said wheel is disposed intermediate said drawbar members.

3. In a trailer vehicle of the class described having a drawbar head and frame means including a pair of drawbar members extending divergently rearwardly from said head, and castor wheel landing gear including a head, a wheel, an axle therefor, and a support for said axle, swivel-mounted in said head and formed to dispose said axle substantially offset from the swivel axis: hinge means mounting said landing gear head on said drawbar head to swing thereon about a horizontal axis angularly disposed between lines running longitudinally and transversely of said vehicle, to provide retractile adjustment of said landing gear between a working arrangement wherein said swivel axis is upright and said axle is horizontal, and an idle arrangement wherein said swivel axis is horizontal, said axle is upright, and said wheel is disposed intermediate said drawbar members, and body means mounted on said frame means rearwardly of said drawbar members and including a front gate hinged to overlie said drawbar members when lowered to open position.

4. In a trailer vehicle of the class described having a drawbar head and frame means including a pair of drawbar members extending divergently rearwardly from said head, and castor wheel landing gear including a head, a wheel, an axle therefor, and a support for said axle, swivel-mounted in said head and formed to dispose said axle substantially offset from the swivel axis: hinge means mounting said landing gear head on said drawbar head to swing thereon about a horizontal axis angularly disposed between lines running longitudinally and transversely of said vehicle, to provide retractile adjustment of said landing gear between a working arrangement wherein said swivel axis is upright and said axle is horizontal, and an idle arrangement wherein said swivel axis is horizontal, said axle is upright, and said wheel is disposed intermediate said drawbar members, one of said drawbar members having means receiving a rim portion of said wheel for securement of said wheel and support against motion about said swivel axis when said landing gear is in said idle arrangement, and means for securing said landing gear head in said idle arrangement against movement to said working arrangement.

5. In a trailer vehicle of the class described having a drawbar head and castor wheel landing gear including a head, a wheel, an axle therefor and a support for said axle, swivel-mounted in said head and formed to dispose said axle substantially offset from the swivel axis: hinge means mounting said landing gear head on said drawbar head, to swing thereon about a horizontal axis which is angularly disposed between lines running longitudinally and transversely of the vehicle, to provide retractile adjustment of said landing gear between a working arrangement wherein said swivel axis is upright and said axle is horizontal, and an idle arrangement wherein said swivel axis is horizontal and said axle is upright and rearward of said drawbar head.

6. In a trailer vehicle of the class described having a drawbar head and caster wheel landing gear including a head, a wheel, an axle therefor and a support for said axle, swivel-mounted in said head and formed to dispose said axle substantially offset from the swivel axis: hinge means mounting said landing gear head on said drawbar head, to swing thereon about a horizontal axis which is angularly disposed between lines running longitudinally and transversely of the vehicle, to provide retractile adjustment of said landing gear between a working arrangement wherein said swivel axis is upright and said axle is horizontal, and an idle arrangement wherein said swivel axis is horizontal and said axle is upright and rearward of said drawbar head, the offset of said axle from said swivel axis and the angularity of said hinge means axis being so related that in its said idle arrangement, the weight of said landing gear will be balanced on the longitudinal center line of the vehicle.

ALMON J. CHAPIN.

REFERENCES CITED

The following references are of record in the file of this patent:

UNITED STATES PATENTS

| Number | Name | Date |
| --- | --- | --- |
| 2,331,006 | Suttles | Oct. 5, 1943 |